H. B. OBERHACKE.
BUILT UP STRUCTURE OF GLASS OR THE LIKE.
APPLICATION FILED SEPT. 3, 1912.
1,158,144.
Patented Oct. 26, 1915.
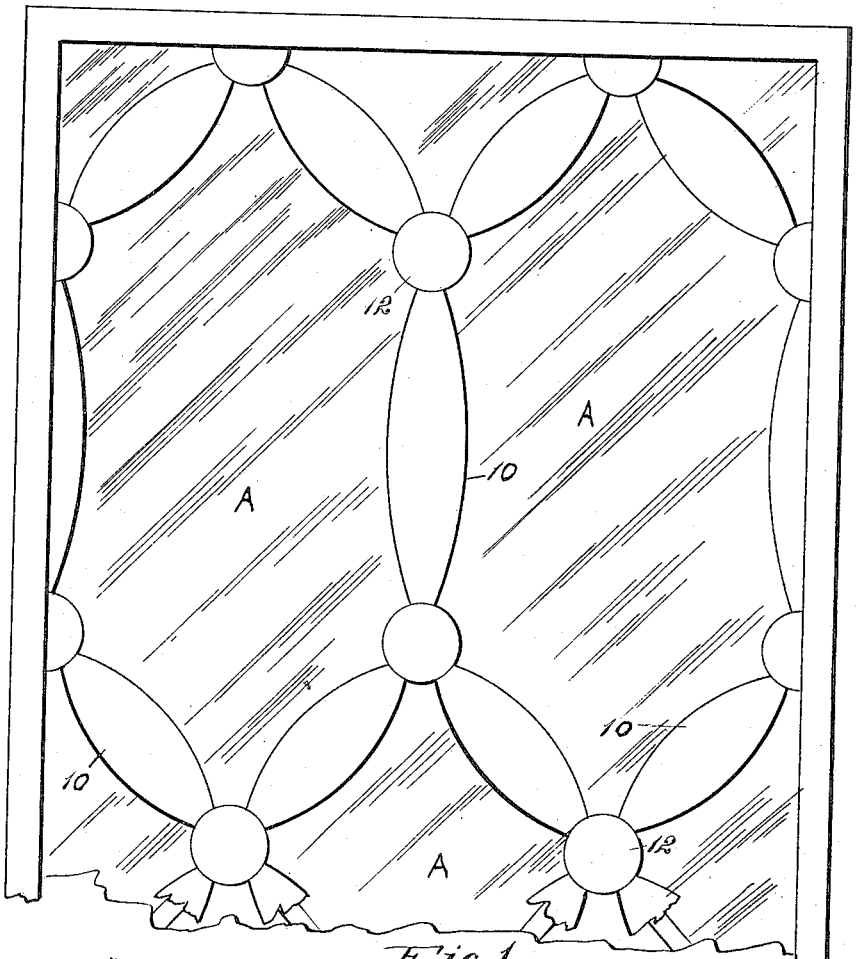
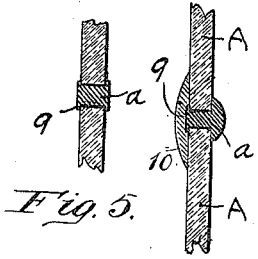
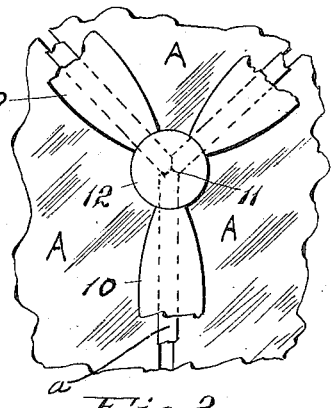
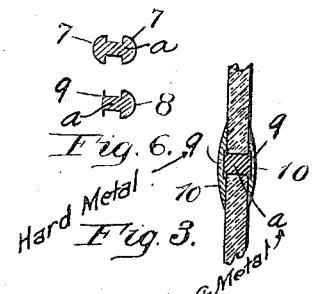

UNITED STATES PATENT OFFICE.

HENRY B. OBERHACKE, OF LOS ANGELES, CALIFORNIA.

BUILT-UP STRUCTURE OF GLASS OR THE LIKE.

1,158,144. Specification of Letters Patent. Patented Oct. 26, 1915.

Application filed September 3, 1912. Serial No. 718,327.

*To all whom it may concern:*

Be it known that I, HENRY B. OBERHACKE, a citizen of the United States, and resident of Los Angeles, in the county of Los Angeles and State of California, have invented certain new and useful Improvements in Built-Up Structures of Glass or the like, of which the following is a specification.

This invention relates to built-up glass construction having a plurality of sheets or pieces or sections or panes of glass, held together to constitute the complete formation, such as a window, glass panel, lamp shade or the like. In accordance with present practice such glass sheets or panes are held together by connecting strips or joining strips known as cames, of lead, tin, solder or other flexible or soft metal. Strips are extended along the cames in the lines of junction between the several glass sections or panes. These strips are usually made of lead or other soft metal, and it results that the total composite or built-up glass structure is inherently weak and flexible and easily bent or caused to bulge or warp: and an application of extreme heat would cause the cames of lead, and the narrow strip extending along the cames at the lines of the joints, to melt, permitting the glass sections to fall apart. I introduce further factors of rigidity and inherent strength in such composite or built-up glass structures, associating with the cames means for providing such structures with inherent rigidity, and means for producing decorative effect or design by providing a configuration or formation of the means applied to the cames to produce such inherent strength or rigidity of the structure. It is true that diversified patterns of such cames of lead or like strips over them have been produced, but no definite configuration of the means for strengthening the structures, consisting of varying the width and conformation of such means, has heretofore, to my knowledge, been provided.

In accordance with my invention, I utilize cames of ordinary or modified or mutilated form, as will be requisite or expedient best to utilize the invention, and at either one or both faces of the built-up glass structure I provide laterally extended strips which are connected with the cames and lie along the faces of the composite glass structure, at the points between the individual panes; such strips being susceptible of configuration in themselves, by variation of dimension, so as to produce artistic and highly attractive and decorative designs upon the built-up glass structure. Such strips are formed of hard relatively inflexible or rigid material, whereas the cames themselves may be and preferably are of soft material such as solder or lead. The reinforcing strips may suitably be formed of brass, steel or other hard metal upon which a suitable formation or surface may be provided. The complete composite structure, with the reinforcing strips held to the cames and firmly pressed against the faces of the glass sections at and beyond the joints, is of great inherent strength, and cannot be bent, buckled or warped under anything but the most excessive pressures or stresses. Even the application of excessive heat which might melt the cames, would still leave the glass sections held firmly between the reinforcing strips or systems of strips so as to prevent the falling apart and breaking of the sections. In expensive art glass construction such saving is of material value. The reinforcing strips are, in practice, contorted or configured or elaborated in shape and dimensions so as to produce artistic, beautiful and decorative designs, which highly enhance the beauty and attractiveness and value of the built-up glass structure.

It will be seen from the above that I produce a built-up glass structure which constitutes a novel article of manufacture or product, which, while possessing great inherent strength and rigidity, impossible to be obtained with the ordinary weak pliable cames alone, or with such cames plus the soft pliable bead strips or wires which have been applied thereto, is at the same time of an enhanced beauty and attractiveness because of the provision of decorative design in the formation of the hard, rigid inflexible strengthening strips applied to the cames proper. I therefore do not provide a new came alone, or do not rely upon a new came as the essential feature of my improvements, but provide a new composite structure comprising glass sections, cames, and decorative, strengthening and reinforcing relatively broad strips applied to the cames, all as above set forth and hereinafter specifically described with reference to the accompanying drawing.

The invention has manifestly for its objects the provision of a novel built-up glass construction which will be superior in point of inherent strength and rigidity and durability, freedom from liability of fracture or breakage or damage by heat or the like influence, beauty and attractiveness and decorativeness of appearance, and length of life, combined with inexpensiveness and simplicity taken in consideration with the other objects and features.

In the drawing: Figure 1 is a fragmentary face view of a composite glass structure constructed and organized in accordance with the invention; Fig. 2 is a fragmentary view illustrating the method of assemblage of the features shown in Fig. 1; Fig. 3 is a fragmentary sectional view of portions of glass sections showing the method of uniting the same with the said cames and the reinforcing or strengthening strips on both sides; Fig. 4 is a similar view showing the reinforcing or strengthening strip upon but one side of the glass sections; Fig. 5 is a view similar to Fig. 3 with the reinforcing and strengthening strips omitted; and Fig. 6 is a sectional view of two cames, one constructed according to present day practice, and the other modified in construction in accordance with the invention.

Corresponding parts in all the figures are designated by the same reference characters.

Referring with particularity to the drawing, A designates a section or pane of glass, in each instance, a plurality of the same being held together by cames $a$ preferably of lead or other soft material and which are shown as having thin laterally projecting edge flanges 9, at one or both edges, in substitution for the beads 7 usually provided at the edges of such cames. Where but one such flange 9 is provided, a bead 8 similar to the usual beads 7 may be employed at the other edge of the came.

10 designates in each instance one of the reinforcing or strengthening strips applied to the cames or respective came $a$, over the line of junction between the sections A between which the respective came is inserted. Each such strip is preferably of brass, steel or other rigid and approximately inflexible material, and is applied to the came by floating or soldering it on to the soft metal of the came so that the two metals are caused to firmly adhere. The cames $a$ are shown as coming together at various junction points, as at 11, and over these junction points disks or decorative rigid bodies 12 of the same material as the strips 10, may be placed, being floated or soldered on to and caused to adhere to the cames which converge at such meeting points 11, the reinforcing strips 10 and the disks 12 extending materially over the surface or surfaces of the glass sections, in close contact laterally of the marginal portions of the sections which abut against the cames $a$. Being rigidly held to the cames, such strips 10 or disks 12 bear positively upon the sections and hold them firmly in positions of assemblage, against any possibility of distortion, separating, buckling or relative movement whatsoever. Such strips 10 and disks 12 may be applied at both faces of the sections A, as shown in Fig. 3, or at one face of the sections, as shown in Fig. 4, and such disks or strips are floated or soldered on to and caused to adhere to the thin flanges 9 projecting laterally of the cames at the edge or edges thereof.

The reinforcing strips 10 and disks 12 are not confined merely to the lines of junction of the glass sections, as stated, but extend materially over the surface thereof, at one or both sides, so as to effectively bind the sections together in a rigid frame or frames composed of metallic members of non-yielding quality as stated. Such lateral extension of the strips and disks is featured by configuration or design with decorative ends in view, as suggested by the simple showing in Figs. 1 and 2 of the drawing. It is manifest that such variation of width or dimensions of such strips and disks may be caused to conform to elaborate design, producing highly artistic effects thus resultant upon the pre-determined dimensions and variations of dimensions of the strips and disks.

The thin edge flanges 9 of the cames are provided merely to hold the sections in assemblage prior to the application of the strips 10. The holding function is performed by the said strips and the cames or webs of the cames between the meeting edges after the strips have been applied to the cames; and such flanges 9 are not intended to resist strains tending to separate or displace the sections, excepting during the process of assemblage of the parts. Thus, if I desire, I may use a harder substance or material for the cames than is possible in present day practice, in which the cames have the heavy beads 7 which militates against bending of the cames to adapt them to irregular edge conformations of the sections A.

It is manifest that within the realm of the invention I may widely vary the materials and substances, and the form and dimensions, of the parts and features entering into the invention, and I therefore do not desire that the invention be construed with limitation to any unnecessary or unwarrantably specific features or aspects pertinent to the embodiment thereof.

Having thus described my invention I claim and desire to secure by Letters Patent:

1. As an improved article of manufacture, a built-up structure comprising a plurality of separate sections of glass or the like, soft and flexible cames fitted between the adjacent edges thereof and permitting the sections to be relatively adjusted or fitted together prior to final assemblage due to the flexibility of the cames, and strips of hard laterally inflexible material applied to and connected with the cames and extending materially beyond the adjacent edges of abutting sections in both directions and in superficial contact with the sections over the edges thereof at both sides of the cames and whereby the sections are held rigidly against movement; said strips being of a definitely varied width or conformation as predetermined whereby decorative design is produced.

2. As an improved article of manufacture, a built-up structure comprising a plurality of separate sections of glass or the like, soft and flexible cames fitted between the adjacent edges thereof and permitting the sections to be relatively adjusted or fitted together prior to final assemblage due to the flexibility of the cames, and strips of hard laterally inflexible material applied to and connected with the cames and extending materially beyond the adjacent edges of abutting sections in both directions and in superficial contact with the sections over the edges thereof at both sides of the cames and at both faces of the sections and whereby the sections are held rigidly against movement; said strips being of definitely varied width or conformation as predetermined whereby decorative design is produced; and whereby the sections connected by the cames are rigidly held together in an unyielding frame preventing buckling or distortion.

3. As an improved article of manufacture, a built-up structure comprising a plurality of separate sections of glass or the like, flexible cames fitted between the adjacent edges thereof and permitting the sections to be relatively adjusted or fitted together prior to final assemblage due to the flexibility of the cames, and strips of hard laterally inflexible material applied to and connected with the cames and extending materially beyond the adjacent edges of abutting sections in both directions and in superficial contact with the sections over the edges thereof at both sides of the cames and whereby the sections are held rigidly against movement.

4. A built up glass structure including a series of glass sections, cames interposed between adjacent edges of the glass sections and formed of soft pliable metal, said cames being provided at one edge with a thin lateral flange for temporarily holding the glass sections, flat faced reinforcing strips of harder metal floated upon the thinly flanged edges of the webs of the cames so as to project laterally over and be in facial contact with the edge portions of the glass sections and hold the same rigidly in position, and disk members of the harder metal floated upon the intersections of the cames and connecting adjacent ends of the reinforcing strips.

Signed at the city of Los Angeles, county of Los Angeles, State of California, this 10th day of February, 1912.

HENRY B. OBERHACKE.

Witnesses:
 JOHN TUMLER,
 J. S. ZERBE.

Copies of this patent may be obtained for five cents each, by addressing the "Commissioner of Patents, Washington, D. C."